(12) United States Patent
Scholzen et al.

(10) Patent No.: US 10,309,496 B2
(45) Date of Patent: Jun. 4, 2019

(54) BELT DRIVE AND METHOD FOR MONITORING SUCH A BELT DRIVE

(71) Applicant: Walther Flender GmbH, Dusseldorf (DE)

(72) Inventors: Andreas Scholzen, Moers (DE); Simon-Martin Schmidt, Dusseldorf (DE)

(73) Assignee: Walther Flender GmbH, Dusseldorf (DE)

( * ) Notice: Subject to any disclaimer, the term of this patent is extended or adjusted under 35 U.S.C. 154(b) by 0 days.

(21) Appl. No.: 15/566,843

(22) PCT Filed: May 6, 2016

(86) PCT No.: PCT/EP2016/060188
§ 371 (c)(1),
(2) Date: Oct. 16, 2017

(87) PCT Pub. No.: WO2016/177883
PCT Pub. Date: Nov. 10, 2016

(65) Prior Publication Data
US 2018/0128352 A1    May 10, 2018

(30) Foreign Application Priority Data
May 7, 2015 (DE) .......... 10 2015 107 177

(51) Int. Cl.
*G01B 3/44* (2006.01)
*G01B 3/52* (2006.01)
(Continued)

(52) U.S. Cl.
CPC .......... *F16H 7/02* (2013.01); *G01L 5/04* (2013.01); *G01M 13/023* (2013.01)

(58) Field of Classification Search
CPC .......... F16H 7/02; G01M 13/023
(Continued)

(56) References Cited

U.S. PATENT DOCUMENTS

| 5,339,150 A * | 8/1994 | Hubble, III ............ B41J 2/45 347/116 |
| 2005/0064971 A1 | 3/2005 | Sasaki et al. |
| 2010/0060677 A1 | 3/2010 | Jones et al. |

FOREIGN PATENT DOCUMENTS

| DE | 102006002118 A1 | 5/2007 |
| DE | 202007008043 U1 | 11/2007 |

(Continued)

OTHER PUBLICATIONS

English Translation of KR 20080079111, Dec. 3, 2008.*
English Abstract of TW 200951753, Dec. 16, 2009.*

*Primary Examiner* — Michael P Nghiem
(74) *Attorney, Agent, or Firm* — The Webb Law Firm (57) ABSTRACT

A belt drive and a method for the monitoring thereof allows conclusions to be drawn regarding loads to which the belt has been subjected over its past usage period. The method includes a rotatably mounted disc and a belt which is deflected at the disc. The belt and the disc are equipped with a marking and are positioned with respect to each other such that the markings are directly opposite each other in a trigger position when the belt circulates around the disc. The trigger position is recorded by a monitoring device, which emits a signal when the markings are located in the trigger position. The number of signals triggered over a time period is recorded. The loads to which the belt or the disc have been subjected during the time period is determined while taking into consideration relevant influencing variables.

14 Claims, 3 Drawing Sheets

(51) Int. Cl.
  *G01C 9/00*      (2006.01)
  *G01C 17/00*     (2006.01)
  *G01C 19/00*     (2013.01)
  *F16H 7/02*      (2006.01)
  *G01M 13/023*    (2019.01)
  *G01L 5/04*      (2006.01)

(58) Field of Classification Search
  USPC .................................................. 702/34, 150
  See application file for complete search history.

(56) References Cited

FOREIGN PATENT DOCUMENTS

| | | | |
|---|---|---|---|
| DE | 102009003732 | A1 | 10/2010 |
| DE | 202017107083 | * | 10/2017 |
| DE | 202016008396 | U1 | 11/2017 |
| EP | 2028497 | A2 | 2/2009 |
| JP | 2004340853 | A | 12/2004 |
| JP | 2005227207 | A | 8/2005 |
| JP | 2008179447 | A | 8/2008 |
| JP | 2012202538 | A | 10/2012 |
| KR | 1020080079111 | A | 8/2008 |
| KR | 20100031079 | A | 3/2010 |
| WO | 2012117160 | A1 | 9/2012 |

\* cited by examiner

BELT DRIVE AND METHOD FOR MONITORING SUCH A BELT DRIVE

CROSS-REFERENCE TO RELATED APPLICATIONS

This application is the United States national phase of International Application No. PCT/EP2016/060188 filed May 6, 2016, and claims priority to German Patent Application No. 10 2015 107 177.0 filed May 7, 2015, the disclosures of which are hereby incorporated in their entirety by reference.

SUMMARY OF THE INVENTION

The invention relates to a belt drive and a method for monitoring such a belt drive wherein so-called toothed or synchronous belts and a method for the monitoring thereof are in particular considered here.

Belt drives of the type in question here respectively consist at least of a drive or deflection disc and a belt which is laid around the disc and contacts the discs over a section of the disc circumference (looping arc).

If the belt is a flat belt, the disc thus generally has a correspondingly flat, unstructured circumferential surface on its circumference coming into contact with the belt. If the belt is, in contrast, a V-belt, then the disc is generally provided with a notch surrounding its circumference in which the V-belt sits. In the case where the belt is a toothed or synchronous belt, the disc is provided with toothing on its circumference, the shape and division of which corresponds to the shape and division of the toothing of the toothed or synchronous belt. When the toothed or synchronous belt circulates around the disc, the teeth of the toothed belt engage into the gaps present between the teeth of the disc such that a positive connection of the belt and the disc effective in the rotational direction of the disc is achieved.

The design of belts usually takes place on the basis of performance values indicated in catalogues which the belt manufacturers publish in a general manner, i.e. not application-oriented. The data of different manufacturers on the belt drives offered by them are not comparable with each other because it is not discernible on what basis the data have been determined. It is in particular not known on which service life basis the values have been specified. Detailed guidelines or standards on how performance values that are comparable with each other can be determined do not exist at present. Instead the manufacturers of belt drives define their own calculation and design methods. As a result, the properties and selection criteria indicated by the different manufacturers are not comparable with each other or are at best comparable with each other with great effort and significant uncertainty. The products with seemingly similar property profiles often prove not to be exchangeable with each other because the indicated properties have been determined in different ways.

A rough guideline for calculating the requirements which belt drives must fulfil can be found in the guideline VDI 2758. It says in section 3: "The belt transmission must on the one hand operate safely under the predefined requirements or operational conditions (rotational speeds, torques, space requirement, overloads, shaft displacements, temperatures and other environmental influences) over a reasonable time and should on the other hand affect the environment as little as possible (noise, oscillations etc.)." It remains open as to how these requirements can be fulfilled in the case of optimal use of the power potentials provided by the respective drive belts.

In order to ensure that a drive belt fulfils the requirements placed on it in spite of many uncertainties and influencing variables, which are not considered in the conventional manner of designing belts, the power requirements determined in practice on the basis of the expected loads are imposed with security surcharge. These are so high that all uncertainties in the design are covered.

What is disadvantageous here is that the respectively selected belt would safely fulfil the mechanical requirements placed on it. However over dimensioning that is, in parts, considerable must be accepted for this purpose. There is hereby the danger that for certain applications, optimal solutions are overlooked or cannot be found. Thus the security surcharge provided as standard can result in requirements for the mechanical properties of the belt to be used that are so high that these requirements can be fulfilled only by one belt whose other material properties, for example its flexibility, lie outside the range in which they have to be in order to fulfil the requirements arising for the intended application even with respect to this property.

Likewise, it is very difficult using the methods common in practice to design a belt drive with regard to its expected service life. Empirical values or results of targeted tests are not considered in this conventional manner of the design.

A flexible belt in particular intended as a drive belt is known from DE 10 2009 003 732 A1 which is equipped with at least one sensor and its own internal power source for the sensor in order to record operational states. The power source is formed by at least one flexible piezo element by way of which electric energy portions are generated when there is a temporal change of the bending radius of the belt, thus whenever the belt section fitted with the piezo element circulates around one of the belt discs of a belt drive. The piezo element is connected to the sensor via electric connection elements likewise arranged in the belt, said sensor can in turn be coupled to a data storage device arranged in the belt in order to log the measurement results recorded by the sensor. Moreover, a rectifier and an electric energy storage device can also be arranged in the belt in order to load the energy portions delivered by the piezo element via the rectifier in the energy storage device. The energy storage device can thereby continuously supply the sensor and the data storage device with energy.

Against the background of the previously explained prior art, the object is to indicate a belt drive and a method for the monitoring thereof by means of which it is easily possible to achieve measurement results which enable a conclusion to be drawn on the loads to which the belt is subjected over its past usage period such that a prediction can for example be made for the remaining service life of the belt.

With regard to the method, the invention has achieved this object by going through at least the work steps indicated for monitoring a belt drive.

With regard to the belt drive, the invention has achieved the previously mentioned object by such a belt drive being formed in the manner indicated.

Advantageous designs of the invention are indicated in the dependent claims and are explained in detail below as is the general inventive concept.

A method according to the invention for monitoring a belt drive comprising a rotatably mounted disc and a belt which is deflected on the disc, wherein the belt and the disc are respectively equipped with a marking and the belt and the disc are positioned with respect to each other such that the markings (K1, K2) of the disc and belt are directly opposing each other in a trigger position when the belt circulates around the disc, thus comprising the following work steps:

a) Recording the trigger position by means of a monitoring device, wherein the monitoring device emits a signal when the markings are located in the trigger position;
b) Recording the number of signals triggered over a certain past time period; and
c) Determining the loads to which the belt or the disc are subjected to during the past time period based on the number of triggered signals corresponding to the number of circulations of the belt, and taking into consideration relevant influencing variables.

A belt drive according to the invention comprising a rotatably mounted disc, a belt deflected on the disc and a monitoring device is correspondingly characterised in that a marking is applied on the belt and on the disc respectively and in that the monitoring device triggers a signal when the markings of the disc and the belt are directly opposing each other on the disc.

The invention thus proposes to fit the disc and the belt and to couple them to a monitoring device such that the course of the disc and the belt can be monitored and precise information regarding the number of circulations which the belt has completed in the course of its usage period is obtained on the basis of the results of this monitoring.

For this purpose, in the case of a belt drive according to the invention, the belt and the disc are respectively equipped with a marking, wherein the belt and the disc are positioned with respect to each other such that the markings of the belt and the disc are directly opposing each other on the disc in the case of a certain operational position of the belt drive (trigger position). Likewise, a monitoring device is provided for a drive according to the invention which emits a signal when the markings are located in the trigger position.

This signal of the monitoring device shows, in the case where the number of teeth of the belt is a whole multiple of the teeth of the disc, that the belt has completed a full circulation. In the case where the number of teeth of the belt does not form a whole multiple of the number of teeth of the disc, the signal indicates that the belt has completed a number of full circulations which is defined by the ratio of number of teeth of the belt to the number of teeth of the disc.

The number of circulations completed in total by the belt can be maintained by means of a counter coupled to the monitoring device. The counter can in this regard be part of an evaluation device which records the number of signals triggered by the monitoring device and based on this information and considering further influencing variables, determines the loads to which the belt or the disc are subjected during their past use.

All marks are fundamentally suitable as markings for the purposes according to the invention which can be attached to the belt and the disc and on the basis of which it can be determined whether the markings have reached the trigger position. Marks that are optically, magnetically, electrically or are in any other way physically recordable are for example considered.

As it is at least recorded according to the invention how often the markings of the belt and the disc meet each other in the trigger position, i.e. how many circulations the belt has gone through, considering the respectively relevant influencing variables, such as material properties of the belt and the disc, geometry of the belt and the disc, friction conditions, temperatures, environmental atmosphere, etc., exact statements may be made regarding the loads to which the belt has been subjected over its past usage period. By recording for example the power consumption of the drive motor, in the case of an electric motor for example by recording the current consumption, a conclusion can be drawn regarding the power transferred by the belt by considering the respectively occurring losses. From the respectively obtained information, conclusion can then be drawn regarding the remaining service life of the belt or the disc by means of a suitable evaluation device. This information in turn allows targeted maintenance and, if required, an exchange of the elements of a belt drive according to the invention that have respectively reached the end of their service life.

The method according to the invention allows a set value comparison to be carried out based on the recorded number of signals or based on the determined loads of the belt or disc. To this end, the number of signals recorded in work step b) or the loads determined in work step c) are compared with a set value. In the case where the recorded number of the signals or the determined load deviates from the respective set value, then a notification regarding the necessity for a maintenance operation or an emergency stop can be triggered.

The monitoring according to the invention thereby delivers information regarding irregularities and deviations of the belt drive from its target operation. Thus, in the case of drives with toothed or synchronous belts, jumps can be recorded which make an immediate maintenance operation necessary. Equally, in the case of flat or V-belt drives, slippages can be detected so that corresponding counter measures can be initiated in a timely manner. The monitoring also delivers an immediate notification regarding breakage of the belt, which, when detected, can for example trigger an "emergency stop signal".

A further essential aspect of the invention is that information regarding the long-term behaviour of belt drives under the most varied conditions are achieved by the monitoring carried out according to the invention. This information can be used as a basis for an application-oriented selection of the belt that is optimally suitable for the respective application purpose. A method which uses this kind of information for the selection of a machinery component is the subject matter of a German patent application 10 2015 107 176.2 the content of which is incorporated into the disclosure of the present application.

In particular in combination with the approach according to the invention, but also independently thereof, it may be expedient for the marking of the belt or the disc to bear information regarding properties of the belt or the disc such that the respective information can be read from the monitoring device and can be considered when determining the loads. The individualisation achieved thereby allows not only a clear allocation of the respective information to the component concerned, but also allows the informative value of the information obtained by the monitoring of the marking to be optimised.

In this case, the marking, with which the belt or the disc is equipped, is thus an identification means which is not only a mark recordable by a monitoring device, but is also an information carrier. The identification means can then bear any information (e.g. manufacturer/manufacture date/customer name/date of commissioning/material properties etc./planned service life/change interval/guarantee agreements etc.). This information can be used by the evaluation device when determining the loads of the belt or the disc that occurred in the past and for making a prediction for the remaining service life of these elements.

By the belt or the disc itself bearing the information relevant to it and clearly customised for it, the method according to the invention can be carried out using one and the same monitoring and evaluation device with any belt/disc combinations without separate data related to the respective belt/disc combination having to be stored in the monitoring or evaluation device. However, independently of the invention it is also possible to carry out monitoring of the property changes occurring during the course of use with the aid of correspondingly customised belts or discs.

As a marking, in particular of the belt, identification means are particularly suitable which actively transfer information to a receiver or can be activated by a receiver such that they send the information borne by them to the receiver upon request. The marking in the disc may then be formed by a sensor which in this case not only indicates when the trigger position has been reached, but also serves as a monitoring device. In this case, the sensor sitting in the disc thus emits the signal indicating a complete circulation of the belt when the chip of the belt and the sensor meet in the trigger position.

Of course, it may also be expedient, in combination with other markings, to form the marking of the disc as a sensor which is activated in the sense of a monitoring device when it is located together with the marking of the belt in the trigger position.

To this end, provided correspondingly marked belt and disc are used in the sense of the invention, the sensor of the disc used as a marking and the marking of the belt merely have to be matched to each other such that when the markings of the belt and the disc have arrived together in the trigger position, the marking of the belt triggers a signal from the sensor used as the marking of the disc.

A further design which is particularly advantageous in practice in many cases in connection with the invention, however, independently thereof provides great benefits as an independent proposal in the case of monitoring belt drives is characterised in that the marking of the belt or the disc is formed as an active element which records one or a plurality of properties of the belt or the disc in operation and delivers them to the monitoring device when the trigger position has been reached. The markings of the belt or the disc are formed here such that they actively monitor one or a plurality of properties of the belt or the disc in operation and deliver the result of this monitoring as a signal to the monitoring device when the trigger position has been reached. It is thus for example possible to record the dynamic or static forces prevailing in the belt, the temperature development of the belt, its elongation or its other deformations when circulating around the disc by means of a sensor arranged in or on the belt used as a marking.

The drive belt used for driving the roller can also be correspondingly equipped with active element such as sensors. The elongation of the belt and thus the applied tensile load can be determined for example via strain gauges. These are in turn a benchmark for the applied torque. Drive belts must for example be pre-stressed in accordance with the force to be transferred. Incorrect (pre-) stressing of the belt leads to a reduction of the belt service life. By recording the applied torque and the available belt prestress by means of suitable sensors used optionally as markings and by comparing the result of this recording with a set value for the prestress, a warning signal can be emitted or the drive turned off in the case of the prestress being undercut in order to avoid damage to the belt. Similarly in cases where the belt prestress depends on the extension behaviour of the equipment in which the respective belt drive is operated, the respectively prevailing belt prestress can be recorded and if required readjusted when, as a result of high external temperatures and thus associated extension of the equipment, there is an excessively high prestress due to the increase of the distance between the rotational axes of the belt discs or, as a result of low external temperatures, there is an excessively low prestress due to the reduction of the distance between the rotational axes of the belt disc.

An example for an identification means, which bears a large amount of information that is readable by means of a suitable sensor, is an RFID chip.

The size of readable identification means or active measuring sensors available today is minimized such that elements of this type can be arranged in the belt without its function being disrupted. The region above the centre of one of the teeth and below the tensile member in the elastic embedding material (e.g. rubber or PU) of the belt is for example recommended as the location for the positioning of such an element in the case of a toothed or synchronous belt. In the case of V-belts, the corresponding element can be arranged below the tensile member. In the case of flat belts, an arrangement between one of the layers of the belt is possible. Moreover, it is possible in the case of any belt type to arrange the identification means on the rear side. To this end, a recess can be formed into which the identification means is inserted.

RFID chips, sensors and other correspondingly miniaturised components considered as a marking of a belt can be embedded into the belt material as early as the manufacturing of the belt when the belts are manufactured individually.

However, in practice, such individual production is an exception. Rather, a very wide belt in the form of a slab is generally provided by the manufacturer from which belts are sectioned off (assembly), whose respective width is then adapted to the width respectively resulting from the intended application.

In order to generally also be able to mark the belt, it is proposed here that the respective marking is introduced into the respective belt after the assembly. To this end, a recess can for example be formed into the belt at a suitable point in which the component serving as a marking is placed. The recess can then be closed in order to protect the component against weather influences.

The recess can be introduced into the material of the belt as a drill hole or in another suitable manner by removing material. To this end, a processing machine may be provided which performs the work steps "positioning the belt", "introducing the recess", "placing the component into the recess", "optionally closing the recess", "removing the belt" at the corresponding processing stations. The machine can also be formed as a processing centre in which the work steps concerned are completed in a clamping process of the belt.

The signals delivered by the respectively provided monitoring and evaluation device can be transmitted by remote data transmission. To this end, the data networks available in the respective operation may be used. This includes data transmission systems that operate on a hard-wired (e.g. LAN) and wireless basis (e.g. WLAN, directional radio).

The data obtained from the monitoring may be sent via remote data transmission to the manufacturers or suppliers of the belt or the disc and used for the purposes of analysing, predicting and in order to construct a selection system of the type already mentioned above. The measurement results may thus be incorporated into the further development of the respectively considered machine components, "belt", "disc", "belt/disc combination". If required, warnings regarding impending damaging events may be sent by the manufacturer or supplier to the user of the respectively monitored belt drive.

A further aspect of the teaching disclosed here is that by marking the belt or the disc with an identification means customised for the respective component, it can be ensured that only the correct belt and the correct disc are respectively used in combination with each other and based on the respective application. Errors in the assembly or selection of the respective pairing of "belt/disc" can thus be safely avoided.

In the event of damage, warranty or guarantee queries can be clarified using the information obtained by the possibilities of monitoring presented here in their different facets. This applies in particular when the monitoring concerned is carried out according to the invention.

It goes without saying that both in the belt and in the respective disc, not only one single, but if needed, even two or more markings may be arranged in suitable distribution in order to enable optimal recording of the respectively monitored properties. In this regard, all or only individual markings may be formed as active elements. It is also conceivable for example to combine a marking formed as a passive information carrier with an active marking which is used as a sensor for recording certain properties or states of the belt or disc.

In the event that the marking of the belt is an active element, its energy supply may for example take place in the manner known from the prior art and which was mentioned in the introduction. Alternatively, it is also conceivable to transfer the required energy in an inductive manner to the active element or an energy storage device likewise arranged in the belt and coupled to the element.

It is also possible to install a photovoltaic element for energy generation on the belt, preferably on the external back thereof. Such elements are available at present as flexible films so that in a suitable embodiment they can also experience the deformations experienced by the belt when it deflects at a disc of the belt drive.

In the case of applications, in which a belt is operated in a reversed manner between two end positions and in which certain belt sections are not deflected at any time on the deflection discs of the belt drive, it is also possible to mount elements for energy generation in the relevant sections that are not deflected so that they are kept largely free of mechanical loads.

In the case where the location, at which the energy is generated or coupled in the belt, is distanced from the location at which the energy is required for example by an active marking or sensor element, an electrically conductive connection conductor may be incorporated into the belt in order to connect the respective active element to the device for generating, storing or coupling in the electric energy. Alternatively, the tensile member or a different layer of the belt may also be used for this purpose when it consists of an electrically conductive material or an electrical conductor is incorporated into the relevant layer for the purpose of the manufacture of an electric connection. It is also of course possible to use electrically conductive fibres provided in the belt to transmit signals between a marking designed as an active measurement sensor and a device for signal transmission. Moreover, such electrically conductive fibres can also be used as antenna for wireless transmission of signals to a remote monitoring device.

In the case of the disc, the energy supply of an active marking formed as an information carrier or sensor may for example take place by an energy generation device formed according to the principle of a hub dynamo being arranged in the disc. It is also conceivable to arrange a photovoltaic element for energy generation on the disc. It would also be possible here to transfer the required energy through inductive coupling without contact or use the possibility known per se for generating electric energy by means of a piezo element implemented into the belt. The required energy can of course also be provided by batteries or accumulators in the case there is sufficient space available which are arranged in the respective disc or in the respective belt.

Depending on the respective requirements, different markings formed as sensors may be arranged in the disc or the belt in order to record different properties and influencing variables. Each marking formed as a sensor can be supplied, if required, with the energy required for its operation.

In the case where a disc with one or a plurality of sensors used as the marking is provided, it may be expedient depending on the material respectively used for the disc to record changes in volume. Such changes may occur as a result of temperature changes or as a result of swelling due to external influences such as moisture or effects of chemicals.

The information respectively recorded by the monitoring device may be transmitted, if required, by a plurality of emitters or centrally by a common emitter to a corresponding receiver.

The informative value of the monitoring results achieved in the outlined manner carried out in particular according to the invention may be supported by a torque sensor being arranged on the drive shaft via which the motoric drive of the belt drive takes place. The drive torques acting on the belt drive can be recorded in this manner from which the losses occurring in the belt drive can be determined.

Load spectrums can be logged and compared with the assumptions made for calculating the shafts (or axles). This enables indications as to the load of notches in the shaft due to feather keys, snap ring recesses etc. Any number of factors influencing the service life of the components and thus the ability of the unit to function can thereby be measured and transmitted with the aid of the energy generated to a separate data processing system for further evaluation.

The conveying speed results from the shaft speed and the external diameter of a disc used in a belt drive for deflecting the belt. The diameter of a belt-disc is subject to continuous wear. The decrease in diameter occurring as a result of wear can be determined by means of suitable sensors. If an optimal constant conveying speed is required, the respectively recorded decrease in diameter can thus be compensated by an increase in rotational speed.

It has already been mentioned that the designs previously disclosed have a particularly advantageous impact in connection with the invention and contribute to an optimal use of the invention alone or in combination with other designs.

However, the relevant designs, insofar as they do not directly refer to the invention or directly expand on features of the invention, may also exhibit the advantages and effects explained here concerning them independently of the invention.

BRIEF DESCRIPTION OF THE DRAWINGS

Exemplary embodiments are explained in more detail below on the basis of a drawing. The figures thereof schematically show in each case.

DETAILED DESCRIPTION

Figure 1:
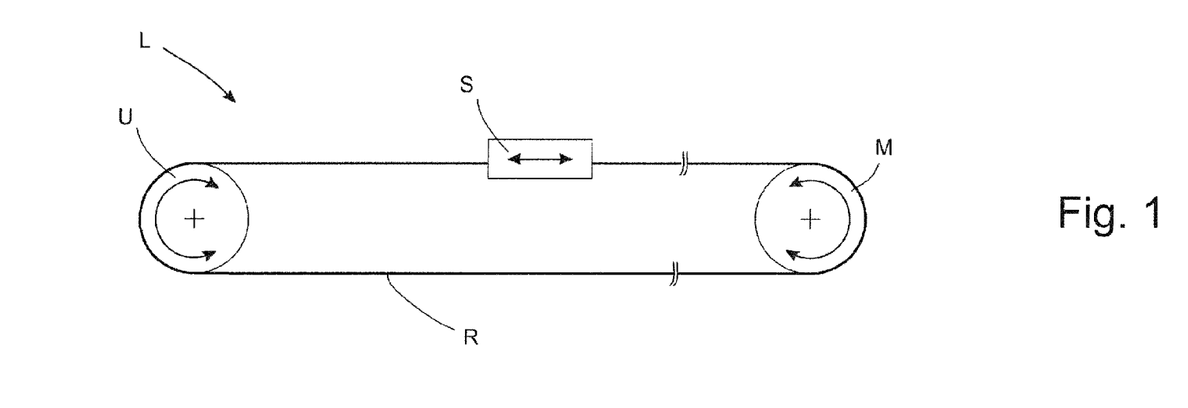
FIG. 1 the principle structure of a belt drive used as a linear axle drive.

Belt drives are typically used in linear axle drives. In the simplest case, a linear drive unit L, as depicted in FIG. 1, consists of a drive disc M, a deflection disc U, a moveable slide S and the belt R to which the slide S is coupled. The slide S is moved back and forth in continuous change by means of the belt R between its two end positions.

Figure 2:
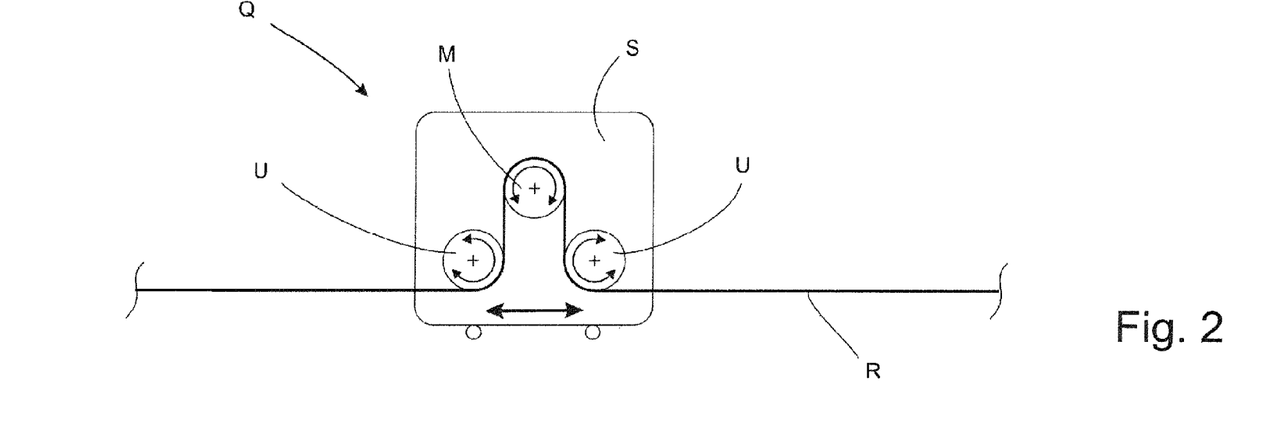
FIG. 2 the principle structure of a so-called "omega drive (Ω drive) Q"

A further example for a belt drive Q is the so-called "omega drive (Ω drive)" depicted in FIG. 2. The drive disc M of the motor and two deflection discs U formed as rollers are attached to a moveable slide S.

Figure 3:
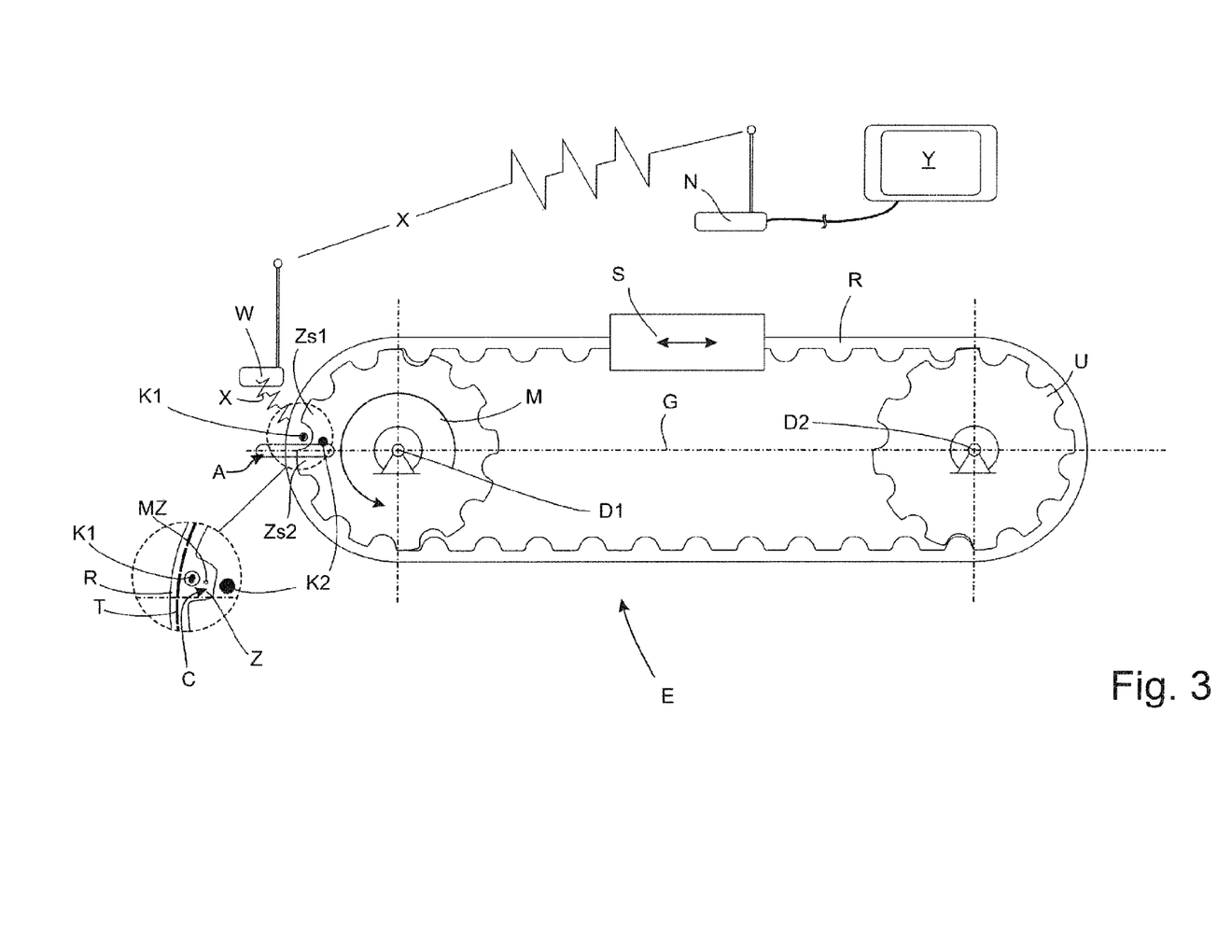
FIG. 3 a belt drive.

In FIG. 3 it is demonstrated on the basis of a different drive unit E how a belt drive according to the invention may be designed and how the monitoring according to the invention of the belt drive (=drive unit L) may be carried out. The drive unit E according to FIG. 3 is suitable for example for transferring a drive torque applied by the motor disc M to a drive, not shown here, coupled to the deflection disc U.

The belt R is formed as a conventional toothed belt.

The drive disc M and the deflection disc U are accordingly provided on their circumferential surfaces coming into contact with the teeth Z of the belt R with a toothing formed corresponding to the geometry and arrangement of the teeth Z of the belt R such that the teeth Z of the belt R engage in a positive-locking manner into the toothing of the discs U, M when they circulate around the discs U, M.

The belt R loops around the disc U, M equally sized in the present case by respectively 180°.

An RFID chip K1 is arranged in the belt R as a marking. The RFID chip K1 in this regard sits in a recess which has been drilled into one of the teeth Z of the belt R after the belt R has been assembled. The recess with the RFID chip K1 is in this regard arranged in the elastic embedding material of the belt R in the region of the foot of the tooth Z, i.e. between the centre MZ of the tooth Z and the tensile member T of the belt R.

The RFID chip K1 bears for example information regarding the type, the manufacture date, the date of the entry into use as well as the materials used for the belt and the like.

A sensor K2 is arranged in the drive disc M as a marking. The sensor K2 is a device by means of which the information stored on the RFID chip K1 used as the marking of the belt R may be read out.

The sensor K2 is arranged in an edge region of the disc M close to a gap C between two teeth Zs1, Zs2 of the disc U. If the tooth Z of the belt R provided with the RFID chip K1 is dipped into the gap C, the RFID chip K1 and the sensor K2 meet each other as a result and the sensor K2 reads the information available on the RFID chip K1. The sensor K2 is thus used as a monitoring device which records when the sensor K2 and the RFID chip K1 are opposing each other.

The trigger position A, i.e. the position in which the marking of the belt (RFID chip K1) and the marking of the disc (sensor K2) are directly opposing each other and the sensor K2 emits a corresponding signal X, is defined as the position in which the sensor K2 and the RFID chip K1 with the tooth Z of the belt R equipped with the RFID chip K1 sitting in the gap C both sit on the straight line G, said straight line runs through the rotational axes D1, D2 of the discs U, M ("09:00 position of disc U)". The RFID chip K1 and the sensor K2 are thus just before the trigger position A in FIG. 3 in the case of the rotational direction indicated for the drive disc M.

The sensor K2 delivers the signal X, which indicates that the RFID chip K1 and the sensor K2 have reached the trigger position A at the same time, as a radio signal to a transceiver device W which sends the signal X to a receiver device N for example via WLAN or LAN which is in turn coupled to an evaluation device Y.

In addition to the signal which indicates the meeting of the RFID chip K1 and the sensor K2 in the trigger position A, the signal X may also comprise information which the sensor K2 read out from the RFID chip K1.

The evaluation device Y records the number of the signals X sent and associated therewith the number of circulations completed by the belt R. Based on this information and the additionally transmitted information read out by the RFID chip K1 regarding for example quality and state of the belt R, a prediction is made regarding its expected remaining service life and required maintenance measures initiated.

Figure 4:
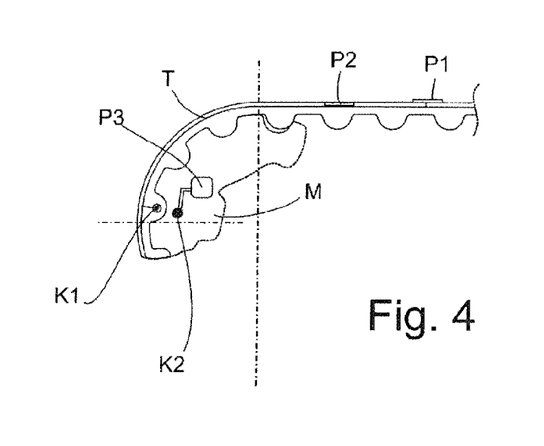
FIG. 4 a section of a belt used in the belt drive according to FIG. 3 in a side view.

Based on FIG. 4, it can be discerned that respectively one marking K1 can be arranged in the region of the teeth Z of the belt R particularly loaded in practical use wherein these markings K1, as previously explained, are usually an active sensor or an RFID element. The marking K1 can accordingly bear, record, send or collect information regarding the belt R in order to deliver it to the sensor K2 used as the monitoring device. In addition to the markings K1, a conventional storage device for storing electric energy may also be available in the region of the teeth Z of the belt R via which the active markings K1, i.e., the sensors or active identification means used as markings in the sense of the invention are supplied with the energy required for their operation.

Figure 5:
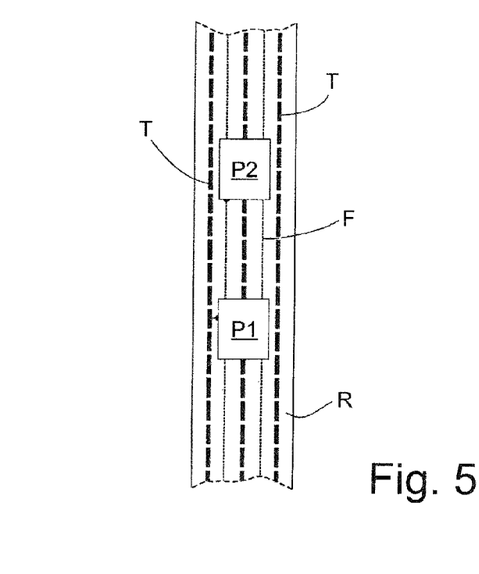
FIG. 5 the belt section according to FIG. 4 in a plan view of its back.

As shown in FIGS. 4 and 5, photovoltaic elements P1 for generating electric energy or light-emitting elements P2, for example photo diodes are arranged on the rear side of the belt R facing away from the teeth Z of the belt R, said photo diodes can emit light signals in order to signal certain operational states of the respective belt R. The connection between the elements P1 and the energy storage device or the marking K1 takes place via electrically conductive fibres F incorporated into the belt R which may be incorporated into the material of the belt R for example as part of the tensile member T or as a separate connection conductor.

A photovoltaic element P3 for generating the energy which is required to operate the sensor K2 is arranged in a corresponding manner adjacent to the sensor K2 on the front end of the drive disc M.

Lift drives should be mentioned as a further practical example for the teaching disclosed here in the case of which two toothed belts operating in parallel are generally operated for safety reasons. If one belt fails, then the remaining belt can still maintain the load or at least distribute it in a controlled manner.

Lift drives often carry out only one movement between a lower and an upper end position between which, however further stops can be completed at defined positions if required. As a result of this, the same teeth of the belts are always loaded with the brake and accelerating forces. In this regard, it concerns teeth which are located in the looping region of the belt disc at the time of the respective stop or when the respective end position has been reached. The same belt tooth is also always in the same disc gap in the same stroke position.

By providing the belts and the discs with a marking, in particular a marking formed as an identification means, the strokes achieved can be determined by the number of contacts in the respective positions. To this end, at suitable points, an RFID can for example be implemented in a belt tooth as a marking and a sensor likewise used as a marking can be implemented in a disc gap. The respective tooth is clearly characterised by the information borne by the RFID such that it can be clearly determined when the tooth reaches the respective gap in the critical stop position.

The disc easily rolls over the other belt teeth without causing large loads on the respective teeth. The number of contacts carried out between the relevant teeth and the disc can thereby be determined for the "critical" teeth and the remaining service life can be reliably predicted up to a possible belt failure by comparison with the reachable contacts stored in a database.

The ideal force distribution on both belts results when both belts are produced and pre-stressed in an identical manner. The force or the tensile load of the belts can be determined via strain gauges. The tensile load can be measured by means of suitable sensors and transmitted by means of suitable transmission means (for example by means of RFIDs) to an external receiver. This can take place on the discs or at any point on the belt.

It is also conceivable for both belts or sensors on both belts to synchronise the respectively applied stress with each other. The tensile members present in the belt may be used for the purpose of energy conduction, transfer or input.

In the reverse operation, not all sections of the belt run around the disc. At the regions, which do not run around the disc, a signal device implemented in the belt can for example indicate by way of an optical signal whether or not the belt is in an orderly state. This signal device can in particular indicate whether or not the loads present in the belt are within a predefined tolerance scope. If there is an excessively large deviation, this can also be signaled via the evaluation device coupled to the monitoring device such that the unit can be turned off prior to the occurrence of greater damage.

REFERENCE NUMERAL

A Trigger position
C Gap between the teeth Zs1, Zs2
D1, D2 Rotational axes of the discs U, M
E Drive unit
F electrically conductive fibres
G Straight line
K1 RFID chip
K2 Sensor ("marking" and "monitoring device")
L Linear drive unit
M Drive disc
MZ Centre of a tooth Z
N Receiver device
P1 Photovoltaic element
P2 Light-emitting element
P3 Photovoltaic element
Q Omega drive
R Belt
S Slide
T Tensile member of the belt R
U Deflection discs
W Transceiver device
X Signal
Y Evaluation device
Z Teeth of the belt R
Zs1, Zs2 Teeth of the disc U

The invention claimed is:

1. A method for monitoring a belt drive, comprising:
providing a first marking comprising a monitoring device on a rotatably mounted disc, the first marking being offset from the center of the disc;
providing a second marking on a belt which is deflected at the disc;
wherein the first marking and the second marking are positioned on the disc and the belt, respectively, such that during circulation of the belt around the disc, the first marking and the second marking reach a trigger position in which the first marking and the second marking are in line with a center of the disc, wherein a rotational axis of the disc runs through the center of the disc;
a) recording, by the monitoring device, when the trigger position is reached, wherein the monitoring device emits a signal when the markings are located in the trigger position;
b) recording a number of signals emitted by the monitoring device over a certain past time period; and
c) determining loads to which the belt or the disc have been subjected to during the past time period based on the number of signals emitted by the monitoring device corresponding to a number of circulations of the belt, and taking into consideration relevant influencing variables.

2. The method according to claim 1, wherein in step c), material properties of the belt and the disc, geometries of the belt and the disc, friction conditions, prevailing static or dynamic forces, elongation or deformations of the belt when circulating around the disc, temperatures, environmental atmosphere or power consumption of a drive motor provided to drive the belt drive are considered as influencing variables.

3. The method according to claim 1, wherein, based on the determined loads and taking into consideration the influencing variables, a prediction is made by an evaluation device regarding an expected service life of the belt or the disc.

4. The method according to claim 1, wherein the number of signals recorded in step b) or the loads determined in step c) are compared with a set value, and, in a case where the recorded number of signals or the determined load deviates from the respective set value, a notification regarding the necessity of a maintenance operation or an emergency stop is triggered.

5. The method according to claim 1, wherein at least one of the first marking or the second marking bears information regarding the properties of the belt or the disc, wherein the information is read from the monitoring device and considered when determining the loads.

6. A belt drive comprising:
a rotatably mounted disc bearing a first marking comprising a monitoring device, the first marking being offset from the center of the disc, and
a belt deflected at the disc, the belt bearing a second marking,
wherein the first marking and the second marking are positioned on the disc and the belt, respectively, such that during circulation of the belt around the disc, the first marking and the second marking reach a trigger position in which the first marking and the second marking are in line with a center of the disc, wherein a rotational axis of the disc runs through the center of the disc; and wherein the monitoring device is configured to emit a signal when the markings of the disc and the belt are located in the trigger position.

7. The belt drive according to claim 6, wherein the monitoring device is coupled to an evaluation device which counts a number of signals emitted by the monitoring device.

8. The belt drive according to claim 7, wherein the evaluation device is configured to record the number of signals emitted by the monitoring device and, based on the number of signals and taking into consideration further influencing variables, determines loads to which the belt or the disc have been subjected to.

9. The belt drive according to claim 8, wherein the evaluation device is coupled to the monitoring device for reading the information borne by at least one of the first marking and the second marking.

10. The belt drive according to claim 6, wherein the second marking is an identification means which bears information regarding the belt.

11. The belt drive according to claim 10, wherein at least one of the first marking and the second marking is an RFID chip.

12. The belt drive according to claim 10, wherein a case where the belt is a toothed belt or synchronous belt, the identification means is arranged above a centre of teeth of the belt and below a tensile member in elastic embedding material of the belt or on a rear side of the belt; in a case where the belt is a V-belt, the identification means is arranged below the tensile member or on the rear side of the belt; or in a case where the belt is a flat belt, the identification means is arranged between layers of the belt.

13. The belt drive according to claim 6, wherein at least one of the first marking or the second marking is formed as an active element which records one or a plurality of properties of the belt or the disc in operation and delivers the properties to the monitoring device when the trigger position has been reached.

14. The belt drive according to claim 6, wherein the monitoring device is connected to a device for remote data transmission.

* * * * *